No. 12,472.

REISSUED APR. 17, 1906.

P. M. WEBER.

ROLLING MILL.

APPLICATION FILED FEB. 19, 1902.

2 SHEETS—SHEET 1.

WITNESSES

H. M. Corwin

L. M. Redman

INVENTOR

Peter M. Weber.

No. 12,472. REISSUED APR. 17, 1906.

P. M. WEBER.

ROLLING MILL.

APPLICATION FILED FEB. 19, 1902.

2 SHEETS—SHEET 2.

WITNESSES

H. M. Corwin

L. M. Redman

INVENTOR

Peter M. Weber.

UNITED STATES PATENT OFFICE.

PETER M. WEBER, OF HOMESTEAD, PENNSYLVANIA, ASSIGNOR TO CARNEGIE STEEL COMPANY, OF PITTSBURG, PENNSYLVANIA, A CORPORATION OF NEW JERSEY.

ROLLING-MILL.

No. 12,472. Specification of Reissued Letters Patent. Reissued April 17, 1906.

Original No. 645,409, dated March 13, 1900. Application for reissue filed February 19, 1902. Serial No. 94,845.

*To all whom it mau concern:*

Be it known that I, PETER M. WEBER, of Homestead, Allegheny county, Pennsylvania, have invented a new and useful Rolling-Mill for Flanged Sections, of which the following is a full, clear, and exact description, reference being had to the accompanying drawings, forming part of this specification, in which—

Figure 1:
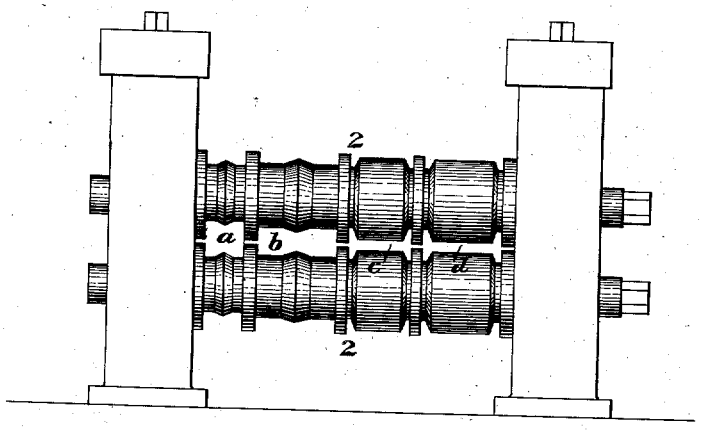
Figure 3:
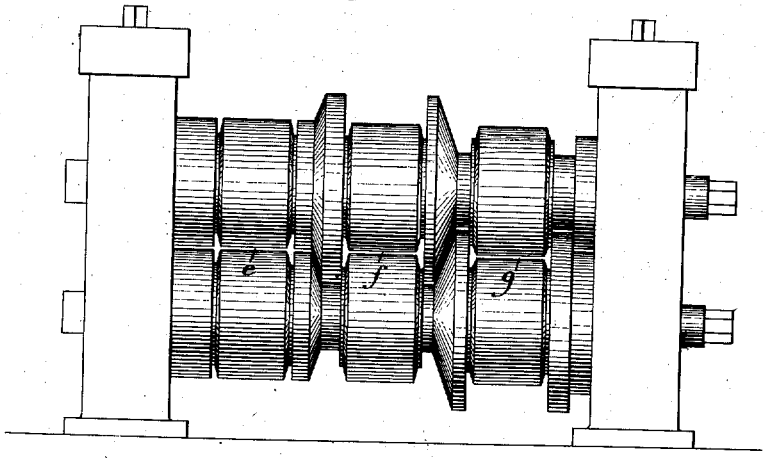
Figure 2:
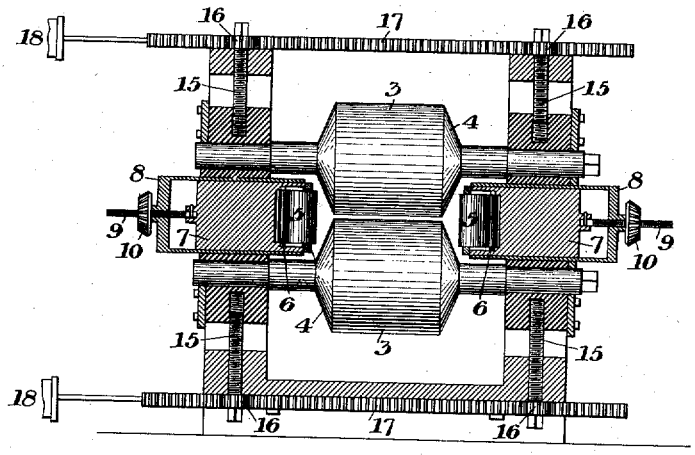
Figure 5:
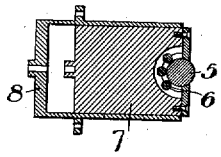
Figure 4:
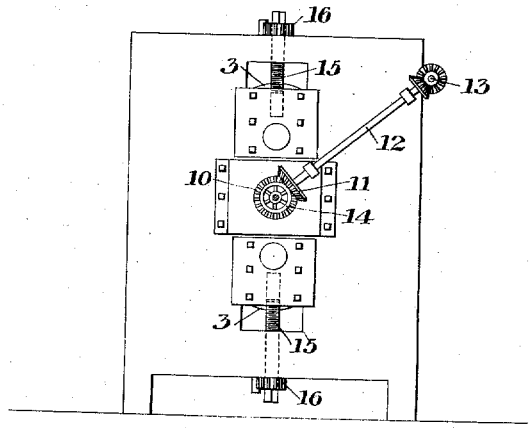

Figure 1 is a front elevation of the roughing or cogging mill which I employ. Fig. 2 is a sectional front elevation of my improved universal mill. Fig. 3 is a front elevation of the finishing-mill. Fig. 4 is an end elevation of the intermediate universal mill, and Fig. 5 is a detail horizontal section of the slide carrying the vertical rolls in the universal mill.

My invention relates to the rolling of flanged sections, and is designed to provide an improved form of universal mill therefor and also to combine with such improved universal mill a cogging-mill and a finishing-mill.

The invention consists, first, in providing a universal mill with frictionally-driven vertical rolls whose axes lie in a vertical plane containing the axes of the horizontal rolls, the diameters of these vertical and horizontal rolls being so proportioned that the horizontal rolls will draw the metal through the mill against the resistance of the friction-rolls.

It also consists in combining with such a mill a finishing-mill to finish the product rolled in this universal mill, and, further, in combining with these two mills a cogging-mill which prepares the metal for the universal mill, and also in the construction and arrangement of the parts, as hereinafter more fully described, and set forth in the claims.

In the drawings referring to Fig. 1, 2 2 represent the upper and lower rolls of the cogging or roughing mill, arranged to prepare the metal for the universal mill of Fig. 2. The mills are shown as arranged for rolling I-beams in this case. The cogging-rolls contain four passes, (lettered, respectively, *a*, *b*, *c*, and *d*.) Each of these passes is formed by suitable collars and recesses upon the rolls coacting to give passes in the usual manner.

The metal rolled in the last pass *d* of the cogging-mill is then taken to my improved universal mill. (Shown in Fig. 2.) This mill is provided with a pair of horizontal rolls 3 3, which are of similar form in this case, having cylindrical central portions, with beveled or conical end portions 4. These rolls are positively driven by any usual driving connections. With these horizontal rolls I combine two vertical rolls 5 5, whose axes lie in a vertical plane containing the axes of the horizontal rolls, as indicated in Fig. 4. I have shown each of these vertical rolls as mounted in roller-bearings 6 in a slide 7, movable in a casing 8, extending through the middle portion of the housing for the horizontal rolls. The slides are adjusted back and forth by means of screw-threaded shafts 9, extending through holes in the outer closing-plate of the casings and through screw-threaded holes in bevel-wheels 10. The bevel-wheels 10 intermesh with similar bevel-wheels 11, carried on inclined shafts 12, having bevel-gear connection with a common connecting-shaft 13. A hand-wheel 14 may be applied to the outer end of one of the screw-shafts, and by turning this wheel the slides carrying the vertical rolls are simultaneously moved toward and from each other. The horizontal rolls may be adjusted by vertical screw-threaded shafts 15, each carrying at its outer end a pinion 16. The pinions 16 at the top are engaged by a rack 17, connected with a motive cylinder 18, the adjusting mechanism for the lower horizontal roll being similar thereto. The racks are preferably operated in unison, though they may be independently operated, if desired. After the metal has been rolled in this intermediate universal mill it is finished upon the mill shown in Fig. 3, which is shown as provided with three passes *e*, *f*, and *g*, through which the metal is successively passed. The reduction in this finishing-roll is slight, it being employed mainly to give the exact sizes of the flanges and webs desired.

The advantages of my invention result from the obtaining of a practical universal mill for flanged shapes, such as beams, angles, channels, rails, and similar shapes. For such shapes the friction-rollers must be placed at the centers of the horizontal rolls, since otherwise the side pressure of the vertical rolls would buckle the web or plate.

The use of this special universal mill as an intermediate mill for material finished on another mill is of advantage, as I have found that the finishing-mill enables the rolling operation to be carried out more rapidly and gives more accurate results, and the use of a preliminary cogging-mill is also important in preparing the material to enter the universal mill.

By the words "frictionally driven" in my claims I mean that the vertical rolls are driven solely by frictional contact with the metal being rolled, as distinguished from the driving of these vertical rolls by positive connections.

Many changes may be made in the form and shape of the vertical rolls, the means for supporting and adjusting them, as well as in the horizontal rolls and the cogging and finishing rolls, without departing from my invention.

I claim—

1. The combination with a universal mill having horizontal positively-driven reducing-rolls, and vertical rolls driven by friction with the metal being rolled, whose axes lie in a vertical plane containing the axes of the horizontal rolls, the four rolls forming a pass with open edges, of a finishing-mill to which the metal is taken from said universal mill; substantially as described.

2. The combination with a cogging-mill, of an intermediate universal mill having horizontal positively-driven reducing-rolls, and vertical rolls driven by friction with the metal and having their axes lying in a vertical plane containing the axes of the horizontal rolls, the four rolls forming a pass with open edges, and a finishing-mill having closed passes to shape the edges and give uniform results; substantially as described.

3. In a universal rolling-mill, the combination with a housing having a pair of cogging-rolls mounted therein, of a housing having an upper and lower pair of vertical adjustable bearings mounted therein, a horizontal roll journaled in each pair of said bearings and each adjusted toward one another by the said bearings, means for adjusting the said bearings, a casing secured to each side of said housing and arranged between each pair of adjustable bearings, a longitudinally-operating bearing arranged in each of the said casings and provided on their inner face with a semicircular recess in which is mounted a series of roller-bearings, a retaining-plate secured to the inner end of said longitudinally-operating bearings and provided with a rectangular opening, a vertical roll mounted in each of the said recesses, frictionally engaging said roller-bearings, projecting partly through the said opening and retained in position by said plate, and means connected to each of said longitudinally-operating bearings adapted to operate the same simultaneously; substantially as described.

4. In a universal rolling-mill, the combination with a pair of cogging-rolls, a pair of vertically-adjustable universal rolls and a pair of simultaneously-operating longitudinal bearings arranged in relation to said universal rolls, of a pair of finishing-rolls provided between the same with a series of horizontally-arranged passes for finishing I-beams and preventing a fin forming upon the feet thereof, said passes formed by providing each of the said rolls at the first pass with a horizontally-alining collar with tapering sides, an alining collar at each side of the first-mentioned collar and provided with straight sides and so arranged as to form a horizontal portion upon the rolls between the collars, providing the upper of said rolls at the second pass with a collar having each side thereof tapering and terminating in an annular shoulder and further providing said roll with a horizontal portion at the side of each shoulder; providing the lower of said rolls at the second pass with a collar in horizontal alinement with the collar of the upper roll and having its sides tapering and terminating in a horizontal portion in alinement with the annular shoulders of the upper collar, further providing said lower roll at the second pass at the end of each of the horizontal portions with a collar of greater diameter than the alining collar and which operate at the side of each of the annular shoulders of the upper roll; providing the lower of said rolls at the third pass with a collar having each side tapering and terminating in an annular shoulder and further providing said roll with a horizontal portion at the side of each of the said collars, providing said upper roll at the third pass with a collar in horizontal alinement with the collar of the lower roll and having tapering sides which terminate in a horizontal portion in alinement with the annular shoulders of the lower collars, further providing said upper roll at the third pass at the end of each horizontal portion with a collar of greater diameter than the alining collar and which operate at the side of each of the annular shoulders of the lower roll at the third pass; substantially as described.

In testimony whereof I have hereunto set my hand.

PETER M. WEBER.

Witnesses:
C. P. BYRNES,
H. M. CORWIN.